United States Patent [19]

Piskoti

[11] Patent Number: 4,622,412

[45] Date of Patent: Nov. 11, 1986

[54] PROCESS FOR PREPARATION OF MERCAPTO SILICONE FLUID

[76] Inventor: Charles Piskoti, 1595 Wagon Wheel La., Grand Blanc, Mich. 48439

[21] Appl. No.: 642,895

[22] Filed: Aug. 21, 1984

[51] Int. Cl.[4] .............................. C07F 7/08; C07F 7/18
[52] U.S. Cl. .................................................... 556/429
[58] Field of Search ........................................ 556/429

[56] References Cited

U.S. PATENT DOCUMENTS

| | | | |
|---|---|---|---|
| 3,481,962 | 12/1969 | Simmler et al. | 556/429 X |
| 3,509,193 | 4/1970 | Niederprüm et al. | 556/429 |
| 4,046,795 | 9/1977 | Martin | 556/429 |
| 4,230,816 | 10/1980 | Martin | 556/429 X |
| 4,251,277 | 2/1981 | Martin | 556/429 X |

*Primary Examiner*—Paul F. Shaver

[57] ABSTRACT

A mercapto-functional silicone fluid is prepared by hydrolyzing a mercapto-silane and an organosilane, with a weak acid. The hydrolyzate is, then, reacted in the presence of an acid with a mixture of an end-blocking polyalkylpolysiloxane and a chain-extender which is either a cyclic polysiloxane or an alkyl-terminated or hydroxy-terminated silicone fluid.

16 Claims, No Drawings

PROCESS FOR PREPARATION OF MERCAPTO SILICONE FLUID

BACKGROUND OF THE INVENTION

1. Field of the Invention

The present invention concerns mercapto-silicone fluids. More particularly, the present invention relates to methods of preparation for mercapto-silicone fluids. Even more particularly, the present invention concerns methods of preparation of mercapto silicone fluids using mercapto-functional silanes.

2. Prior Art

The use of mercapto-functional silicone fluids has been well reported in the art. These fluids evidence utility as corrosion inhibitors and release agents, as described in U.S. Pat. No. 4,251,277, the disclosure of which is hereby incorporated by reference, as well as a component in fuser oils for photocopy machines, disclosed in U.S. Pat. No. 4,029,827, the disclosure of which is, also, hereby incorporated by reference.

Generally, these compounds have been prepared by mixing together a mercapto alkylalkoxysilane with water and, then, reacting the resulting solution with a mixture of a cycloalkylpolysiloxane and an end-blocked polyalkyl polysiloxane in the presence of an acid catalyst. When this mixture is heated, there is an equilibration of the components, together with the removal of water and alcohol, resulting in the formation of the mercapto-functional silicone fluid. This method is more particularly described in the aforementioned U.S. Pat. No. 4,251,277. While the products produced in accordance with this patent are efficacious, they are disadvantageous from a manufacturing standpoint, due to the relatively high cost of hexamethyltrisiloxane which is employed as the cyclic siloxane in the commercial product.

The present invention, as will subsequently be detailed, provides a new process for preparing mercapto-functional silicone fluids, which is based upon the hydrolysis of a polyalkylpolyalkoxysilane and a mercapto-functional silane. This method enables the formation of polymercapto compounds while employing less expensive cycloalkylpolysiloxanes.

SUMMARY OF THE INVENTION

In accordance with the present invention mercapto-functional fluids are prepared by (a) hydrolyzing a mixture of (1) a mercapto-functional silane and (2) an organosilane, such as, an alkoxyalkylsilane, in the presence of acid and water, (b) optionally, neutralizing the acid and, then, (c) mixing together and heating to about 125° C. to about 175° C., in the presence of an acid, the resulting product of (a) or (b) with (1) a chain-extender which is either a cyclic polysiloxane, an alkyl end-blocked silicone fluid, an OH-terminated silicone fluid or the like and (2) an end-blocking polyalkylpolysiloxane.

The organosilane and mercapto-functional silane are employed in a respective molar ratio of about 2:1 to about 6:1, and, preferably, from about 3:1 to about 5:1.

For a more complete understanding of the present invention reference is made to the following detailed description and accompanying examples.

DESCRIPTION OF THE PREFERRED EMBODIMENTS

As hereinbefore noted the present invention provides mercapto-functional silicone fluids prepared by: (a) hydrolyzing an organosilane and a mercapto-silane with an acid in the presence of water, (b) optionally, neutralizing the acid, and, (c) mixing together and heating, in the presence of an acid, the product of (a) with (1) a chain-extender which is either a cyclic polysiloxane, or a silicone fluid, and (2) an end-blocking alkylpolysiloxane compound.

More particularly, the present invention contemplates, first, hydrolyzing an organosilane fluid and a mercapto-silane fluid with a weak acid in the presence of water. Thereafter, the acid may be neutralized to separate out the hydrolyzate. The hydrolyzate is, then, mixed and reacted at elevated temperatures with a cyclic polysiloxane and an alkylpolysiloxane in the presence of an acid catalyst.

The hydrolysis reaction, as noted, is effected between a mercapto-functional organosilane and an organosilane, and water.

Representative of the useful mercapto-functional silanes are hydrocarbonoxy silanes, such as, methyl, γ-mercaptopropyldimethoxy silane, 3-mercaptopropyltrimethoxysilane, 2-mercaptoethyltriethoxysilane, w-mercaptodecyltriethoxysilane, 2-mercaptohexyltripropoxysilane, mercaptoamyltriethoxysilane, 2-(triethoxysilyl)ethyl butyl thioether, 3-(triethoxysilyl)-propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyldiethoxysilyl)ethyl dodecyl thioether, 6-(trimethoxysilyl)hexyl ethyl thioether and the like, as well as mixtures thereof.

The organosilanes, which may be reacted with the mercapto-functional silane, generally, correspond to the formula:

wherein R and R' are monovalent hydrocarbon radicals or halogenated hydrocarbon radicals having from about 1 to about 18 carbon atoms, and x is an integer ranging from 1 to 3. R and R' may be the same or different.

Examples of suitable monovalent hydrocarbon radicals represented by R are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, a-phenylethyl, B-phenylethyl, a-phenylbutyl and cycloalkyl radicals such as cyclobutyl, cyclopentyl and cylohexyl radicals; halogenated hydrocarbon radicals such as chloromethyl, bromoethyl, fluoroethyl, tetrafluoroethyl, trifluorotolyl, hexafluoroxylyl and the like.

Suitable examples of monovalent hydrocarbon radicals represented by R' are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, a-phenylethyl, B-phenylethyl, a-phenylbutyl and cycloalkyl radicals such as cyclobutyl, cyclopentyl and cyclohexyl radicals.

Within the broad class of useful compounds a particularly preferred mercapto-functional silane is methyl-γ- mercaptopropyldimethoxy silane and a particularly preferred organosilane is diethoxydimethylsilane.

The mercapto-functional silane and organosilane are present, during hydrolysis, in a, respective, molar ratio ranging from about 1:2 to about 1:6 and, preferably, from about 1:3 to about 1:5.

The hydrolysis reaction is carried out in the presence of a weak acid. Useful weak acids are monocarboxylic acids, such as, acetic acid, propionic acid, butylic acid and the like. Generally, the acid is employed in an amount ranging from about 5 percent to about 25 percent by weight, based on the combined weight of the organosilanes. Preferably, from about 5 percent to about 15 percent, by weight, of the acid, based on the combined weight of the organosilanes is employed.

The mercapto-functional silane and organosilane form, during the reaction, an aqueous solution thereof. Sufficient water is added in order to maintain the reactants in solution after the reaction is completed. Usually, equal parts of water to the combined weight of the organosilane and mercaptofunctional silane are employed.

The reactants are mixed together at ambient temperatures and hydrolyzed at a temperature of from about 50° C. to about 90° C. Ordinarily, the cohydrolysis is completed in about 30 to about 120 minutes.

It should be noted that an organic solvent may be added to the reactants to facilitate processing. When used the solvent enhances phase separation between the acid and water phase and the hydrolyzate. Suitable solvents include hexane, heptane, benzene, toluene, xylene and so forth. The solvent is ordinarily present in an amount ranging from about 5 to 75 percent, by weight, thereof based upon the combined weight of the silane reactants.

Although not preferred, it should be noted with respect hereto, that the mercapto-functional silane and the organosilane can be separately hydrolyzed with an acid and, thereafter, mixed together. However, as noted, cohydrolysis is preferred.

The resulting hydrolyzate, generally, contains from about 0.1 to 10 percent, by weight, of thiofunctional groups.

After the cohydrolysis reaction is completed, the acidic solution is, preferably, neutralized with any suitable base, such as, sodium hydroxide, potassium hydroxide, sodium bicarbonate, potassium bicarbonate or the like. Ordinarily, the base compound is added in a molar amount equal to the molar amount of acid employed during the hydrolysis reaction.

Addition of the base causes a distinct phase separation enabling recovering of the hydrolyzate, with or without solvent, from the water and salt phases. Although this step is optional, it does enhance processing because, otherwise, the alcohol and water present from the cohydrolysis reaction must be ultimately split off. By removing the alcohol and water at this phase, the hydrolyzate can be directly employed in the second reaction step.

The recovered hydrolyzate, or the single phase of hydrolyzate, water and alcohol is, then, reacted, in the presence of an acid, with (a) a chain-extending silicone compound which is either (1) a cyclic polysiloxane or (2) an alkyl- or hydroxy- end-blocked silicone fluid, and (b) a polyalkylpolysiloxane. The reaction is carried out at a reflux temperature ranging from about 125° C. to about 170° C. and, preferably, from about 135° C. to about 165° C. Generally, the reaction is completed in about 60 minutes to about 180 minutes.

The end-blocking polyalkylpolysiloxane employed herein is, preferably, a disiloxane.

Representative of suitable disiloxanes are, for example, hexamethyldisiloxane, hexaethyldisiloxane, hexapropyldisiloxane, hexoctyldisiloxane, di(3-mercaptopropyl)tetramethyldisiloxane and the like.

Preferably the disiloxane is hexamethyldisiloxane.

The cyclic polysiloxane corresponds to the formula:

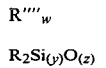

wherein $R''''$ and $R^2$ may be the same or different and correspond to R defined hereinabove, y is an integer ranging from three to twelve; z is equal to y, w or v are integers wherein (w+v) is equal to two.

Representative of suitable cyclic polysiloxanes include, for example, hexamethylcyclotrisiloxane, hexaethylcyclotrisiloxane, hexabutylcyclotrisiloxane, hexaphenylcyclotrisiloxane, octamethylcyclotetrasiloxane, octabutylcyclotetrasiloxane, hexaoctylcyclotrisiloxane, 1,2,3-trimethyl-1,2-3-triphenylcyclotrisiloxane and the like.

The preferred cyclic polysiloxane is octamethylcyclotetrasiloxane.

The other useful chain-extenders are end-blocked silicone fluids, such as a trimethyl end-blocked silicone fluid or hydroxy end-blocked silicone fluid. These compounds are well known and commercially available.

The chain-extender and the end-blocking polyalkylpolysiloxane, are employed in a, respective, molar ratio ranging from about 1:1 to 100,000:1 and, preferably, from about 20:1 to about 1000:1.0. The chain-extender and polyalkylpolysiloxane are employed in the practice of the present invention in a combined weight percent, with respect to the hydrolyzate of a minimum of from about 0.1 percent to about 100 percent and higher and, preferably, from about 50 percent to at least about 100 percent and higher, with respect to the hydrolyzate.

The catalysts which are employed in this step of the reaction are acid clays and organic and inorganic acids having a PK value less than 1.0 and more preferably below 0.7 in aqueous solutions. Suitable acid catalysts which may be employed are benzo-sulfonic acid, para-toluene-sulfonic acid, sulfuric acid, sulfurous acid, nitric acid, perchloric acid, hydrochloric acid and acid clays such as Filtrol No. 13 and No. 24 (available from Filtrol Corporation).

Although the amount of catalyst is not critical, it is preferred that from about 0.001 percent up to about 10 percent by weight of catalyst based on the total weight of the reactants be employed. Greater amounts of catalyst may be used; however, it is the intent of this invention to provide a catalyst system which does not alter the functionality of the resultant composition.

Generally, it is desirable to remove or destroy the catalysts after the reaction is complete because their presence will adversely affect the properties of the resulting composition. The catalysts may be removed, for example, by washing with water or they may be destroyed by neutralizing with basic reagents. In addition, certain catalysts, such as acid clays, may be removed by filtering the reaction mixture.

The reaction may be conducted at atmospheric, subatmospheric or superatmospheric pressure in the absence or presence of a solvent. However, when a solvent is employed, it may be employed in an amount of from about 1 to 50 precent by weight based on the silicon-containing reactants. Examples of the suitable hydrocarbon solvents are those noted above, such as, hexane, heptane, benzene, toluene, xylene and the like.

It is, however, preferred that the reaction be conducted in an inert atmosphere.

The products produced hereby are liquid, generally, having a viscosity of from about 10 to about 100,000 cps.

For a more complete understanding of the present invention reference is made to the following examples. In the examples, which are to be construed as illustrative, rather than limitative of the present invention, all parts are by weight, absent indications to the contrary.

EXAMPLE I

Into a suitable reaction vessel equipped with heating means, agitation means and reflux condenser is charged 30.0 parts of methyl-γ-mercaptopropyldimethoxy silane, 120.0 parts of diethoxydimethyloxysilane, 150 parts of distilled water and 1.0 parts of glacial acetic acid. With stirring the reactants are heated at a reflux temperature of 50° C. and held thereat for 30 minutes. There is, thus, obtained a single phase, clear liquid.

Into a second suitable reaction vessel equipped with heating means, stirring means, thermometer, Dean's Stark trap and addition funnel is charged, under a nitrogen blanket, 1160.0 parts of octamethylcyclotetrasiloxane, 27.0 parts of hexamethyldisiloxane, 116.0 parts of heptane and 10.0 parts of FILTROL 13 acid clay catalyst. With stirring the reactants are heated to a reflux temperature of 145° C. and held thereat.

Then, the cohydrolysis product obtained hereinabove is slowly added to the second vessel over a 180 minute period. The temperature in the vessel drops to about 110° C. and is brought back up to reflux at 145° C. The reaction is continued until the alcohol and water are removed after about 180 minutes. The product is, then, cooled to room temperature, filtered through a Buchner funnel and vacuum stripped, at full vacuum, for 120 minutes at 185° C.

There is, thus, obtained a clear, water-white fluid.

EXAMPLE II

Following the procedure of Example I there is charged into a first reaction vessel 450.0 parts of methyl-γ-mercaptopropyldimethoxy silane, 740.0 parts of diethyoxydimethylsilane, 1190.0 parts of soft water and 12.0 parts of glacial acetic acid. The reactants are heated at reflux for 30 minutes. There is formed a clear, water-white liquid containing a cohydrolyzate. Under a nitrogen blanket, into a second reaction vessel equipped with heating means, thermometer, agitation means, Dean's Stark trap and addition funnel is charged 162.0 parts hexamethyldisiloxane, 2146.0 parts of octamethylcyclotetrasiloxane, 72.0 parts of FILTROL 13 and 200.0 parts of heptane. The contents of the vessel are heated to a reflux temperature of 140° C. and maintained thereat until water and alcohol are completely stripped off.

Slowly, and with stirring, there is added to the second vessel the cohydrolyzate liquid, while maintaining the second vessel at a reflux temperature of 100° C. After the addition is completed, the second vessel is refluxed at 165° C. for 120 minutes to remove alcohol, water and any remaining acetic acid. Thereafter, the contents of the vessel are cooled, filtered and stripped to obtain a clear liquid recovery product.

EXAMPLE III

Example I is repeated except that 259.0 parts of the diethoxydimethylsilane, 157.5 parts of the methyl-γ-mercaptopropyldimethoxy silane, 416.5 parts of soft water, 4.2 parts of glacial acetic acid are employed. The so-obtained liquid is added to a reaction mixture, maintained at a reflux temperature of 110° C.–115° C., of 81 parts hexamethyldisiloxane, 2672.25 parts of octamethylcyclotetrasiloxane, 186.0 parts of heptane and 45.0 parts of FILTROL 13.

After refluxing for 180 minutes at 110° C.–115° C., the vessel contents are heated at 164° C. to drive off all remaining alcohol, water and acetic acid. The vessel is cooled to room temperature and permitted to stand for 16 hours to settle out the clay catalyst. The vessel contents are, then, vacuum filtered and, then, vacuum stripped for 4 hours at 200° C. to recover 2568.5 parts of a clear, liquid fluid.

EXAMPLE IV

Into a suitable first reaction equipped with heating means, stirring means and reflux condenser is charged 630.0 parts of diethoxydimethylsilane and 157.5 parts methyl-γ-mercaptopropyldimethoxy silane. To this is, then, added 787.5 parts of soft water and 52.5 parts of glacial acetic acid.

The temperature in the vessel rises to 35° C. The contents of the vessel is, then, refluxed for about one hour. The solution goes from a two phase solution to a single phase solution and back to a phase separation. To the vessel is, then, added 186.0 parts of heptane to enhance phase separation.

Thereafter, 52.5 parts of potassium hydroxide is added to the vessel and the temperature within the vessel rises to from 57° C. to 68° C. The two phase solution is, then, transferred to a separation vessel. The lower phase is discarded and 751.5 parts of the upper phase are recovered.

Into a second reaction vessel equipped as in Example II is charged, under a nitrogen blanket, 2672.25 parts of octamethylcyclotetrasiloxane, 69.0 parts of hexamethyldisiloxane and 45.0 parts of FILTROL 13 and the 751.5 parts of the upper phase product defined hereinabove. The mixture is heated to a temperature of 155° C. and maintained thereat for two hours until water and alcohol are completely stripped off. The contents of the vessel is cooled to room temperature and, then, vacuum filtered.

Having, thus, described the invention, what is claimed is:

1. A process for preparing a mercapto-functional silicone fluid, comprising:
    (a) hydrolyzing a mercapto-functional silane and an organosilane corresponding to the formula:

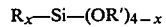
    $$R_x\text{—Si—}(OR')_{4-x}$$

wherein R and R' are each, independently selected from the group consisting of alkyl, aryl, alkaryl, aralkyl and halogenated hydrocarbon radicals, in the presence of a hydrolysis acid; and
    (b) reacting together in the presence of an acid catalyst the hydrolyzed silanes of (a) with (1) an endblocking polyalkylpolysiloxane and (2) a chainextender which is either a cyclic polysiloxane or an alkyl or hydroxy-terminated silicone fluid.

2. The process of claim 1 wherein:

the silanes are hydrolyzed together.

3. The process of claim 2 which further comprises: neutralizing the product of (a) with a base compound prior to reacting it with the product of (b).

4. The process of claim 2 wherein: the cohydrolysis reaction is carried out at a reflux temperature ranging from about 50° C. to about 90° C.

5. The process of claim 2 wherein the hydrolysis acid is a weak organic acid.

6. The process of claim 1 wherein the silanes are, each, independently hydrolyzed prior to reacting the hydrolyzed silanes with the polyalkylpolysiloxane and the chain-extender.

7. The process of claim 1 wherein: the polyalkylpolysiloxane is a disiloxane.

8. The process of claim 1 wherein: the chain-extender is a cyclic polysiloxane corresponding to the formula:

$$R^{''''}{}_w$$
$$R^2{}_v-Si_{(y)}O_{(z)}$$

wherein $R^{''''}$ and $R^2$ are each, independently, selected from the group consisting of monovalent hydrocarbon radicals and halogenated monovalent hydrocarbon radicals, y is an integer from three to twelve, z is equal to y, and (v+w) is an integer equal to two.

9. The process of claim 1 wherein the chain-extender is either an alkyl-terminated silicone fluid or an hydroxy-terminated silicone fluid.

10. The process of claim 1 wherein: the organosilane corresponds to the formula:

$$R_x-Si-(OR')_{(4-x)}$$

wherein R and R' are each, independently, a monovalent hydrocarbon radical or halogenated monovalent hydrocarbon radical and x is an integer ranging from one to three.

11. The process of claim 1 wherein: the chain-extender and end-blocking siloxane are reacted with the hydrolyzate at a temperature ranging from about 125° C. to about 175° C.

12. The process of claim 1 wherein the mercapto-functional silane and organosilane are present in a respective molar ratio ranging from about 1:2 to about 1:6.

13. The process of claim 1 wherein the polyalkylpolysiloxane end-blocker and chain-extender are present in a respective molar ratio ranging from about 1:10 to about 1:100,000.

14. The process of claim 12 wherein: the hydrolyzate is reacted with the end-blocker and chain-extender in an amount ranging from 0.1 percent to about 99.9 percent, by weight, thereof, based on the total combined weight of the reactants.

15. The process of claim 13 wherein:
(a) the mercapto-functional silane is methylmercaptopropyldimethoxy silane,
(b) the organosilane is diethoxydimethylsilane,
(c) the polyalkylpolysiloxane end-blocker is hexamethyldisiloxane, and
(d) the chain-extender is octamethylcyclotetrasiloxane.

16. The product produced by the process of claim 14.

* * * * *